United States Patent [19]

Perry

[11] 4,305,361
[45] Dec. 15, 1981

[54] TWO CYCLE BAFFLED PISTON ENGINE WITH POST-BAFFLE SCAVENGING

[76] Inventor: John C. Perry, 3170 Falcon Dr., Carlsbad, Calif. 92008

[21] Appl. No.: 92,101

[22] Filed: Nov. 7, 1979

Related U.S. Application Data

[63] Continuation of Ser. No. 609,956, Sep. 3, 1975, abandoned, Ser. No. 756,376, Jan. 3, 1977, abandoned, and Ser. No. 889,288, Mar. 23, 1978, abandoned.

[51] Int. Cl.³ ................... F02B 75/02; F02B 33/04
[52] U.S. Cl. .................. 123/65 P; 123/73 PP
[58] Field of Search ............ 123/65 P, 65 PD, 73 R, 123/73 A, 73 C, 73 PP, 73 CA

[56] References Cited

U.S. PATENT DOCUMENTS

| | | | |
|---|---|---|---|
| 569,530 | 10/1896 | Winter | 123/73 A |
| 876,974 | 1/1908 | Knox | 123/73 A |
| 923,046 | 5/1909 | Gulick | 123/73 A |
| 1,075,603 | 10/1913 | Von Schmidt | 123/73 C |
| 1,410,847 | 3/1922 | Still | 123/73 A |
| 1,734,459 | 11/1929 | Curtis | |
| 2,154,975 | 4/1939 | Dufour | 123/73 A |
| 2,391,402 | 12/1945 | Fisk | 123/65 |
| 2,511,405 | 7/1950 | Hoover | 123/69 R |
| 3,494,335 | 2/1970 | Meier | 123/73 R |
| 3,858,562 | 1/1975 | Lanpheer | 123/65 P |

FOREIGN PATENT DOCUMENTS

| | | | |
|---|---|---|---|
| 653712 | 12/1937 | Fed. Rep. of Germany | 123/65 PD |
| 853672 | 10/1952 | Fed. Rep. of Germany | |

*Primary Examiner*—Wendell E. Burns
*Attorney, Agent, or Firm*—Donald R. Nyhagen

[57] ABSTRACT

A two cycle internal combustion engine with improved cylinder scavenging. The described engine embodiment is a baffled piston two cycle internal combustion engine whose power is substantially increased by directing fuel mixture in the normally spent gas filled region behind the piston baffle during each intake-exhaust portion of the engine cycles to scavenge spent gas from this region and increase the total volume of fuel mixture in the cylinder at the time of ignition. According to the preferred practice of the invention a portion of the fuel mixture displaced from the engine crankcase to the cylinder intake port or ports is diverted to auxiliary ports in the cylinder wall which direct the mixture against the rear side of the piston baffle to effect through scavenging of the region directly behind the baffle.

7 Claims, 5 Drawing Figures

TWO CYCLE BAFFLED PISTON ENGINE WITH POST-BAFFLE SCAVENGING

This is a continuation of applications Ser. No. 609,956 filed Sept. 3, 1975, Ser. No. 756,376 filed Jan. 3, 1977, and Ser. No. 889,288 filed Mar. 23, 1978, all now abandoned.

BACKGROUND OF THE INVENTION

1. Field

This invention relates generally to internal combustion engines and more particularly to an improved scavenging method and means for substantially increasing the power of two cycle internal combustion engine.

2. Prior Art

As is well known to those versed in the internal combustion engine art, a two cycle internal combustion engine has a piston which undergoes alternate compression and power strokes, and a combined intake-exhaust phase during a terminal portion of each power stroke and an initial portion of the following compression stroke of the piston. During this intake-exhaust phase, the piston uncovers intake and exhaust ports in the cylinder wall to exhaust spent combustion gas from the cylinder through the exhaust port or ports and admit air/fuel mixture, hereafter referred to simply as fuel mixture, to the cylinder through the intake port or ports. During each piston compression stroke, a partial vacuum is created in the engine crankcase chamber which induces intake air flow through the engine carburetor into the chamber to provide a charge of fuel mixture in the chamber. This fuel mixture is compressed in the chamber during the following piston power stroke and then displaced into the engine cylinder through the cylinder intake ports during the next intake-exhaust phase of the engine.

Two cycle engine operation presents one problem to which this invention is addressed. The problem referred to involves scavenging of spent combustion gas from the cylinder and charging of the cylinder with fuel mixture during each intake-exhaust phase of the engine. Thus, in a two cycle engine, exhaustion of the spent combustion gas and admission of the fuel mixture occur essentially simultaneously, except of course that exhausting of the spent gas commences slightly before admission of the fuel mixture due to initial uncovering of the exhaust ports by the piston slightly before the intake ports. The spent combustion gas is scavenged from the cylinder by the incoming fuel mixture rather than by positive displacement as in a four cycle engine. Since the volume of spent gas remaining in the cylinder at the end of each intake-exhaust phase detracts from the power developed by the engine, efficient scavenging of the spent gas during each intake-exhaust phase is essential to satisfactory engine operation.

A variety of two cycle engine designs have been developed in an attempt to improve this spent gas scavenging action and thereby increase engine power. Two of these engine designs, which are the most widely used, are commonly referred to as Schnierly-ported and baffled piston types. The Schnierly-ported engine relies on a unique arrangement of the cylinder intake and exhaust ports to accomplish efficient scavenging. The baffled piston engine relies on a projecting baffle on the piston, between diametrically opposed intake and exhaust ports, to accomplish efficient scavenging. This baffle deflects the incoming fuel mixture during each intake-exhaust phase of the engine toward the cylinder head to scavenge spent gas from the cylinder head region.

The present invention provides improvements in this latter baffled piston type engine which cure a deficiency inherent in this type of engine. This deficiency resides in the fact that deflection of the incoming fuel mixture by the piston baffle creates in the region behind the baffle relative to the cylinder intake ports, that is the region at the side of the baffle opposite the intake ports, a relatively dead zone from which spent combustion gas is not scavenged. The spent gas remaining in this region at the end of each intake-exhaust phase of the engine represents a substantial loss of potential engine power. That is to say, if this region contained fuel mixture rather than spent gas, the total volume of mixture in the cylinder at ignition, and hence the engine power, would be substantially increased. Thus improved at reasonable cost, the baffled piston engine would be superior to the Schnierly-ported engine because of the relatively high cost of the latter engine.

SUMMARY OF THE INVENTION

This invention provides such improvements for a baffled piston two cycle engine, whereby the normally dead, spent gas filled region behind the piston baffle is scavenged by directing fuel mixture into this region during each intake-exhaust phase of the engine. According to the preferred practice of the invention, the fuel mixture is directed or impinged against the rear side of the baffle both to more efficiently scavenge the region directly behind the baffle and minimize loss of fuel mixture through the exhaust ports.

In the preferred engine described, fuel mixture is directed into the region behind the piston baffle through relatively narrow slot-like auxiliary intake jet ports in the cylinder wall adjacent the ends and directly behind the baffle. These ports are disposed in planes parallel to the cylinder axis and obliquely inclined to the baffle and communicate, through auxiliary intake passages about the cylinder to the engine crankcase chamber. During engine operation, the auxiliary intake ports are uncovered by the piston during each intake-exhaust phase of the engine, and fuel mixture is injected or directed through these ports into the region behind the piston baffle to scavenge spent gas from this region. The incoming mixture is directed obliquely against the rear side of the baffle to thoroughly scavenge the region directly behind the baffle and minimize loss of mixture through the then uncovered exhaust ports.

As will become evident from the ensuing description, the improvements of the invention may be utilized in any baffled piston two cycle engine. The invention will be described in connection with a baffled piston two cycle engine of the kind used in modelradio-controlled airplanes and the like.

DESCRIPTION OF THE PREFERRED EMBODIMENT

Figure 1:
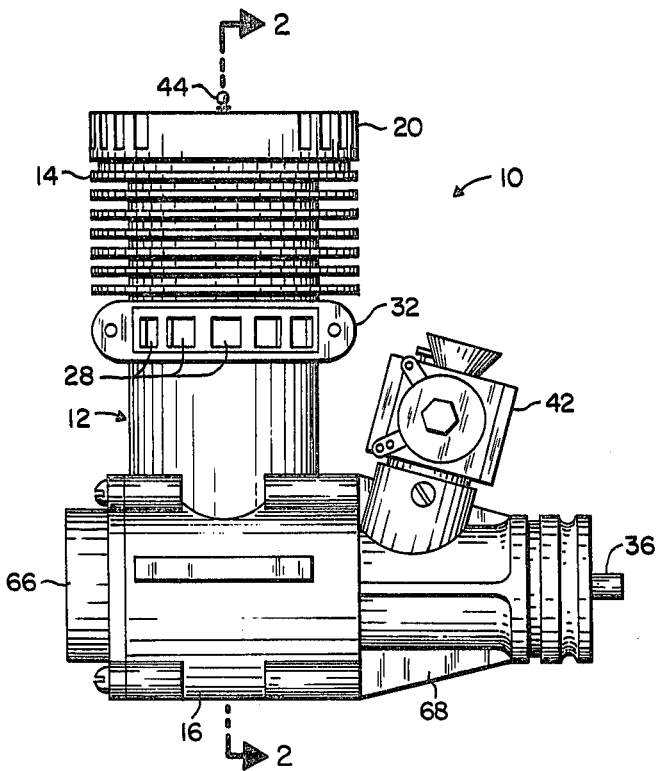
FIG. 1 is a side elevation of a baffled piston two cycle internal combustion engine embodying the invention.

The drawings illustrate a baffled piston two cycle engine 10 having a body 12 with an upper externally finned cylinder portion 14 and a lower crankcase 16. Cylinder portion 14 contains a cylinder bore 18, hereafter referred to simply as a cylinder, closed at one end by a removable cylinder head 20 and opening at its other other end to a crankcase chamber 22 in the engine crankcase 16.

Within the cylinder 18 is a piston 24 which is movable through alternate compression strokes toward the head 20 and power strokes away from the head. The engine operating cycles have a combined intake-exhaust phase during a terminal portion of each piston power stroke and an initial portion of the piston compression stroke. In the wall of cylinder 18 are diametrically opposed intake ports 26 and exhaust ports 28 which are uncovered by the piston during each intake-exhaust phase of the engine. The intake ports 26 communicate to the engine crankcase chamber 22 through an intake passage 30. The exhaust ports 28 open to an exhaust duct 32 on the engine body 12. When the piston 24 is at the lower end of the stroke, as in FIG. 2, the crankcase chamber 22 also communicates with the intake passage 30 through ports 34 in the piston side wall and registering ports (not shown) in the wall of the cylinder.

Coaxially journalled in the engine crankcase 16 is an engine output shaft 36, one end of which extends to the outside of the crankcase, as shown. On the inner end of the shaft, within the crankcase chamber 22, is a counter balanced crank 38 to which the piston 24 is connected by a connecting rod 40, whereby reciprocating motion of the piston through its strokes drives the shaft in rotation.

During each compression stroke of the piston 24 toward the cylinder head 20, a partial vacuum is created in the crankcase chamber 22 which induces air flow into the chamber through a carburetor 42, which mixes fuel with the air to provide a fuel mixture (air/fuel mixture), and intake valve means (not shown). This valve means will be discussed in somewhat more detail later. Suffice it to say that the valve means opens during each compression stroke of the piston to admit fuel mixture to the crankcase chamber.

During each power stroke of the piston away from the cylinder head 20, the intake valve means closes, whereby the fuel mixture is initially compressed in the crankcase chamber 22 by the piston and then admitted to the cylinder 18 upon uncovering of the intake ports 26 by the piston during the intake-exhaust phase of the engine. The fuel mixture is compressed in the cylinder during the next compression stroke of the piston and then ignited by an ignition plug 44 on the cylinder head to drive the piston through its power stroke. The spent combustion gas from this power stroke is exhausted from the cylinder through the exhaust ports 28 when these parts are uncovered during the following intake-exhaust phase of the engine.

Figure 2:
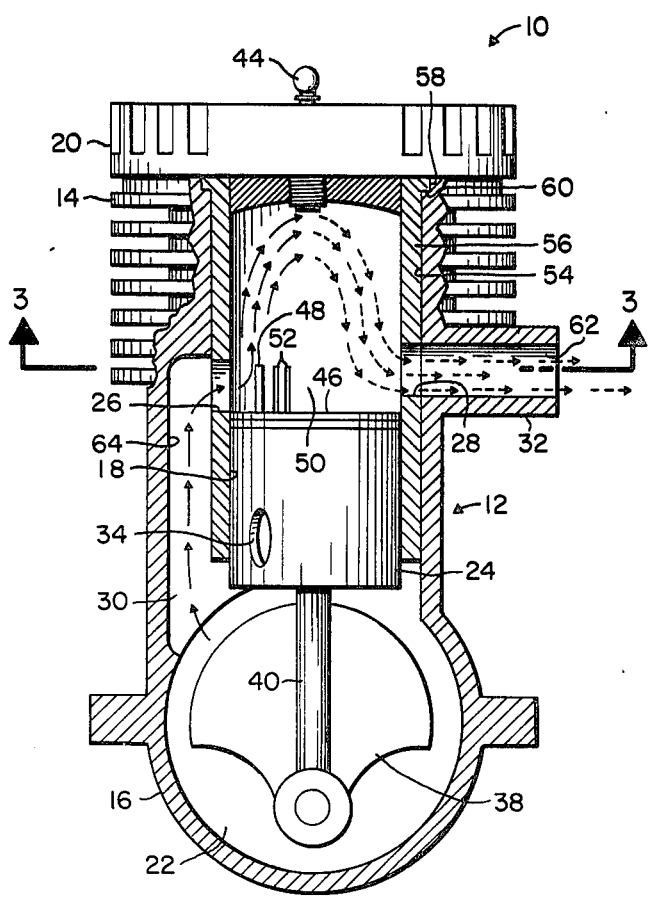
FIG. 2 is a longitudinal section through the engine.

As noted earlier and is well known by those versed in the art, efficient operation of a two cycle engine requires effective purging or scavenging of the spent gas from the cylinder by the fuel mixture during each intake-exhaust phase of the engine. To this end, the existing two cycle engines have their exhaust ports 28 located slightly closer to the cylinder head 20 than the intake ports 26, as shown in FIG. 2, whereby the exhaust ports are uncovered by the piston 24 to vent the spent gas from the cylinder 18 slightly before the intake ports are uncovered to admit the fuel mixture. The cylinder pressure is thereby reduced prior to uncovering of the intake ports to effect inflow of the compressed fuel mixture into the cylinder from the intake passage 30 when the intake ports are uncovered. In addition, the end face 46 of the piston 24 mounts an upstanding baffle 48 which is disposed in a plane parallel to the cylinder axis and passing between the intake and exhaust ports. This baffle is offset from the cylinder axis toward the intake ports and acts to deflect the fuel mixture entering the cylinder through the latter ports toward the cylinder head, as indicated by the solid line arrows in FIGS. 2 and 4, to scavenge the spent gas from the head region of the cylinder, as indicated by the broken line arrows in the figures.

The engine 10 as described to this point is conventional. From the foregoing description of the engine, it will be understood that during each intake-exhaust phase of the engine, the exhaust ports 28 are initially uncovered by the piston 24 to vent spent gas from the cylinder 18, after which the intake ports 26 are uncovered to admit compressed fuel mixture. The piston baffle 48 deflects the entering mixture toward the cylinder head 20 to scavenge the spent gas from the cylinder.

This baffled piston engine design, however, has an inherent deficiency which the present invention cures. The deficiency resides in the fact that deflection of the entering fuel mixture by the piston baffle 48 creates behind the baffle, relative to the intake ports, a relatively static spent gas filled region 50 from which the spent gas is not purged by the fuel mixture. The volume of spent gas remaining in this region at the conclusion of each intake-exhaust phase obviously represents a substantial reduction or loss of engine power.

Figure 4:
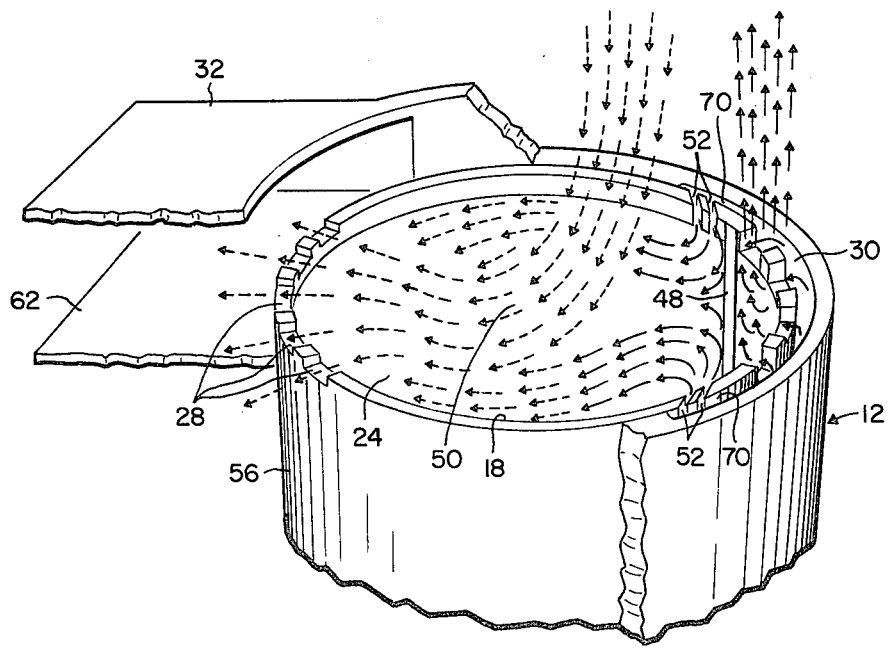
FIG. 4 is a fragmentary perspective section through the engine.
Figure 3:
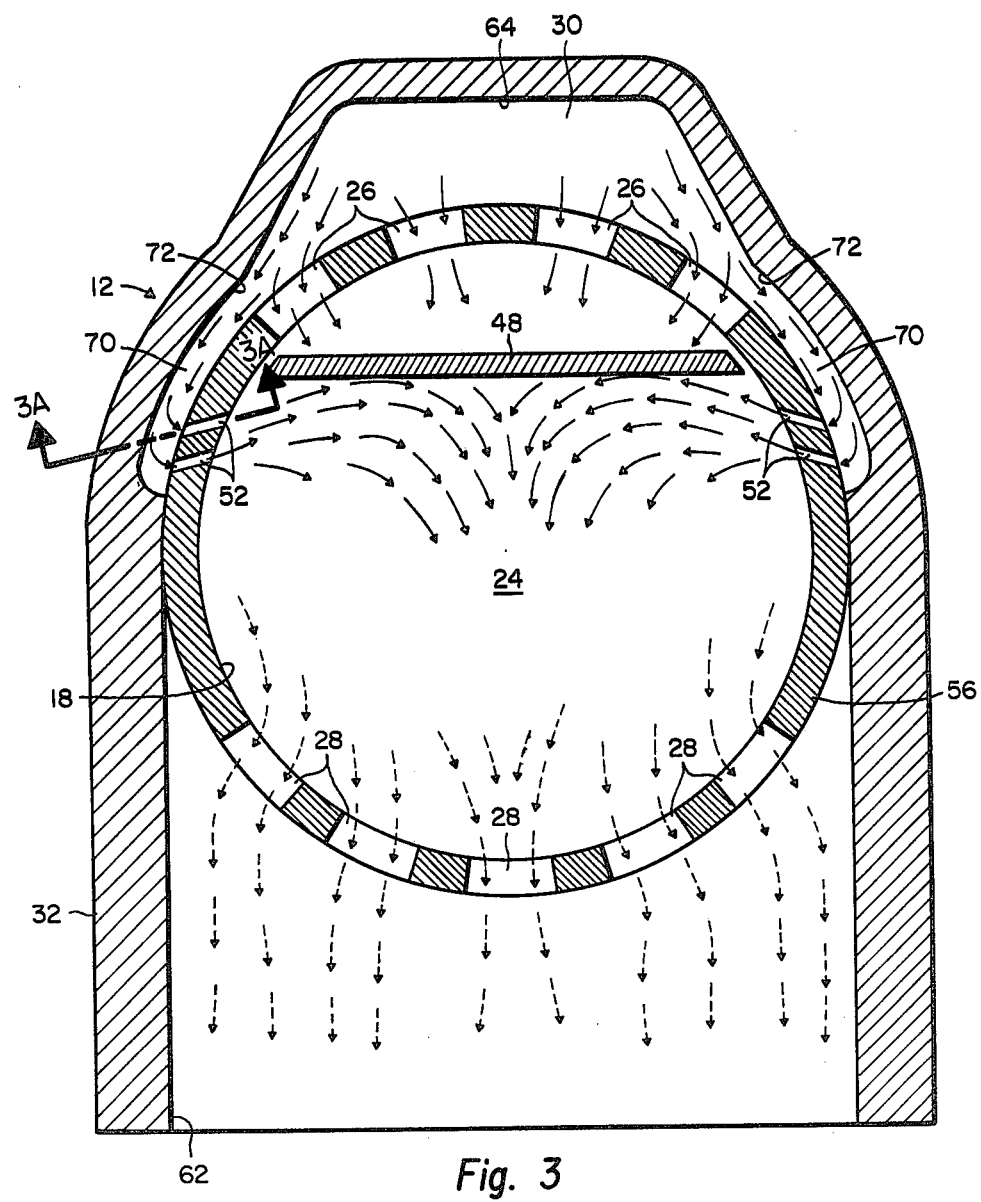
FIG. 3 is an enlarged section taken on line 3—3 in FIG. 2.

According to the present invention, this deficiency of the existing two cycle baffled piston engines is cured by directing additional compressed fuel mixture from the engine crankcase 22 into the region 50 through auxiliary intake ports 52 in the wall of cylinder 18 during each intake-exhaust phase of the engine, in the manner illustrated in FIGS. 3 and 4. This additional or auxiliary fuel mixture scavenges the spent gas from the region and thereby substantially increases engine power. This increase in engine power has been found to be on the order of 20% to 30%. Preferably, the auxiliary ports 52 direct the entering fuel mixture toward and against the rear side of the piston baffle 48 from each end of the baffle, as illustrated in the drawings, to scavenge spent gas from the region immediately behind the baffle. This method of introducing the additional or auxiliary fuel mixture into the region 50 also inhibits loss of the mixture through the exhaust ports 28.

As noted earlier, and is apparent from the foregoing description, the improvements of this invention may be utilized in virtually all if not all two cycle engines. Accordingly, the invention should not be regarded as limited in application to the particular two cycle engine illustrated, which is a small two cycle engine of the kind used on radio controlled model airplanes and the like. This illustrated two cycle engine will now be described in somewhat more detail with regard to the improvements of the invention. Except for these improvements, the engine is conventional and hence need not be described in elaborate detail.

With this in mind, the engine body 12 is a cast body to which the cylinder head 20 is removably joined by screws or the like. Removably fitted within a bore 54 of the body cylinder portion 14 is a hardened cylinder sleeve 56 which forms the cylinder 18. This sleeve is positioned axially in the bore 54 by means of a shoulder 58 on the end of the sleeve adjacent the cylinder head seating in a recess 60 at the adjacent end of the bore. The opposite end of the sleeve terminates just short of the body crankcase chamber 22. Cylinder sleeve 56 has openings which constitute the intake ports 26 and exhaust ports 28.

Exhaust ports 28 register with the exhaust opening 62 through the body exhaust duct 32. The intake passage 30 to which the intake ports 26 open is formed by a recess 64 which is formed in the wall of the bore 54 through the cylinder portion 14 of the cast body 12 and extends downwardly to the crankcase chamber 22. The intake passage is bounded at its outer side by the wall of recess 64 and at its inner side by the cylinder sleeve 56 which overlies and closes the open inner side of the recess. The lower end of the intake passage opens to the crankcase chamber just below the lower end of the sleeve.

The rear end of the crankcase chamber 22 is closed by a rear end member 66 bolted to the crankcase 16. Bolted to the front end of the crankcase is an engine body portion 68 containing a bearing (not shown) in which the engine shaft 36 is journalled and an inlet port (not shown) which cooperates with a port (not shown) in the shaft to form the engine intake valve means referred to earlier. As noted in the earlier discussion, this valve means opens during each compression stroke of the engine piston 14 and closes during each power stroke of the piston. The engine carburetor 42 is mounted on the forward body portion 68 with its air/fuel outlet in communication with the inlet opening to the intake valve means.

The above described structure of the illustrated engine is conventional. According to this invention, the engine is improved by forming the auxiliary intake ports 52 in the cylinder sleeve 56 and forming auxiliary intake passages 70 communicating the ports to the main intake passage 30. The auxiliary ports are formed in the wall of the sleeve 56 at the same elevation as the main intake ports 26, such that the main and auxiliary intake ports are uncovered and recovered similtaneously by the piston 24. The auxiliary ports are located just behind the plane of the piston baffle 48. As noted earlier, the auxiliary ports preferably direct the auxiliary fuel mixture into the region 50 toward and against the rear side of the baffle. To this end, the ports are relatively narrow slots whose width is less than the wall thickness of the cylinder sleeve 56 and which are obliquely inclined toward the plane of the piston baffle to direct the fuel mixture obliquely against the rear baffle side, in the manner shown in the drawings. Since the auxiliary ports are relatively narrow, two ports are preferable provided at each end of the baffle, as shown, to provide adequate volumetric flow of fuel mixture into the region 50. In some engines, however, the auxiliary ports may be made wide enough, without loss of their flow directing capability, to permit use of a single port at each end of the baffle. Other auxiliary fuel mixture intake or intake porting arrangements are possible within the scope of the invention.

Figure 3A:
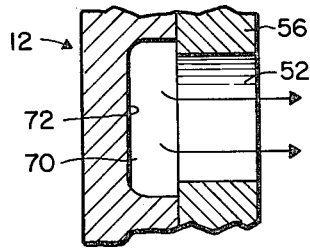
FIG. 3A is a section taken on line 3A—3A in FIG. 3.

The auxiliary intake passages 70 are formed by circumferential recesses 72 (FIG. 3A) in the wall of the engine body bore 54 and extending around the cylinder sleeve 56 from the upper end of the main intake passage 30 to the auxiliary intake ports 52. These auxiliary intake passages are bounded at their outer sides by the cylinder sleeve which overlies and closes the open inner sides of the recesses.

It will now be understood that during operation of the illustrated engine 10, fuel mixture entering the crankcase chamber 22 from the engine carburetor 42 during each compression stroke of the piston 24 is compressed within the chamber during the following power stroke of the piston and then admitted to the cylinder 18, during the intake-exhaust phase, through the intake ports 26, 52. The fuel mixture entering through the main intake ports 26 is deflected to the head region of the cylinder by the piston baffle 48 to scavenge spent combustion gas from this region. The fuel mixture entering through the auxiliary intake ports 52 impinges the rear side of the baffle and scavenges spent gas from the region 50 behind the baffle. This latter scavenging action increases substantially the engine power, as noted earlier. While the illustrated auxiliary intake passages to extend circumferentially of the cylinder to communicate the auxiliary intake ports 52 to the main intake passage 30, the auxiliary intake passages may extend axially of the cylinder from the auxiliary ports directly to the crankcase chamber.

What is claimed is:

1. In a baffled piston two cycle inernal combustion engine, the combination comprising:

a cylinder having a head at one end, a piston movable in said cylinder through alternate compression strokes toward said head and power strokes away from said head and having an end facing said head, each engine cycle having an intake-exhaust phase during a terminal portion of the piston power stroke and an initial portion of the following compression stroke, said cylinder having at opposite sides thereof primary intake and exhaust port means in the cylinder wall which are uncovered by said piston during each said cycle phase to exhaust spent combustion gas from the cylinder through said exhaust port means and admit fuel to the cylinder through said intake port means, an upstanding baffle on said piston end in a plane passing through said cylinder between said intake and exhaust port means parallel to the cylinder axis and located between said axis and said intake port means for deflecting toward said cylinder head fuel entering the cylinder through said intake port means during each said cycle phase to scavenge spent gas from the head portion of the cylinder, said baffle having a rear side facing said exhaust port means, and said cylinder having auxiliary intake ports in the cylinder wall which are uncovered by said piston during each said cycle phase and are situated at opposite sides of the cylinder between said plane and said exhaust port means and immediately adjacent said plane, and said auxiliary ports open to the cylinder in directions obliquely toward said plane and said primary intake port means for directing fuel into said cylinder from opposite ends of and along the rear side of said baffle in directions obliquely toward said baffle and said primary intake port means during each said cycle phase.

2. The combination according to claim 1 wherein;

said auxiliary ports comprise slots disposed in planes parallel to the cylinder axis and oblique to said first mentioned plane.

3. The combination according to claim 1 wherein; said engine comprises a body having a cylinder portion containing a bore closed at one end by said cylinder head, a crankcase chamber at the other end of said bore, and a cylinder sleeve in said bore forming said cylinder and containing said intake and exhaust port means and said auxiliary ports, and said body has recess means in the wall of said bore closed at its inner side by said cylinder sleeve and forming intake passage means communicating said crankcase chamber to said intake port means and said auxiliary intake ports.

4. The combination according to claim 3 wherein; said auxiliary ports comprise narrow slots disposed in planes parallel to the cylinder axis and opening obliquely toward said first mentioned plane, and said recess means comprise a longitudinal recess extending from said chamber to said intake port means and a pair of circumferential recesses extending from said longitudinal recess around opposite sides of said cylinder sleeve to said auxiliary ports.

5. The method of increasing the power of a baffled piston two cycle internal combustion engine comprising a cylinder having a head at one end, a piston movable in said cylinder through alternate compression strokes toward said head and power strokes away from said head and having an end facing said head, each engine cycle having an intake-exhaust phase during a terminal portion of the piston power stroke and an initial portion of the following piston compression stroke, diametrically opposed, intake and exhaust port means in the cylinder wall which are uncovered by said piston during each said cycle phase to exhaust spent combustion gas from the cylinder through said exhaust port means and admit fuel to the cylinder through said intake port means, and an upstanding baffle on said piston end in an axial plane of the cylinder between said intake port means and the cylinder axis for deflecting toward said cylinder head fuel entering said cylinder through said intake port means during each said cycle phase to scavenge spent combustion gas from the cylinder head region, said power increasing method comprising the step of:

directing additional fuel into the cylinder during each said cycle phase thru auxiliary intake ports which are situated at opposite sides of the cylinder between said plane and said exhaust port means and immediately adjacent said plane and open to the cylinder obliquely toward said plane and said primary intake port means, whereby said additional fuel enters said cylinder at opposite ends of said baffle and flow inwardly along the rear side of and obliquely toward said baffle and said intake port means during each said cycle phase.

6. In a two cycle internal combustion engine, the combination comprising:

a cylinder having a head at one end, a piston movable in said cylinder through alternate compression strokes toward said head and power strokes away from said head and having an end facing said head, each engine cycle having an intake-exhaust phase during a terminal portion of the piston power stroke and an initial portion of the following compression stroke, said cylinder having at opposite sides thereof primary intake and exhaust port means in the cylinder wall situated at opposite sides of a plane passing through the cylinder parallel to the cylinder axis and located between said axis and said intake port means, said intake and exhaust port means being uncovered by said piston during each said cycle phase for exhausting spent combustion gas from the cylinder through said exhaust port means and admitting fuel to the cylinder through said intake port means, and said cylinder having auxiliary intake ports in the cylinder wall which are uncovered by said piston during each said cycle phase and are situated at opposite sides of the cylinder between said plane and said exhaust port means and immediately adjacent said plane, and said auxiliary ports open to the cylinder in directions obliquely toward said plane and said primary intake port means for directing fuel into the cylinder from opposite sides thereof and across said piston end in directions obliquely toward said plane and said intake port means during each said cycle phase.

7. The method of increasing the power of a two cycle internal combustion engine comprising a cylinder having a head at one end, a piston movable in said cylinder through alternate compression strokes toward said head and power strokes away from said head and having an end facing said head, each engine cycle having an intake-exhaust phase during a terminal portion of the power stroke and an initial portion of the following compression stroke, primary intake and exhaust port means in the cylinder wall at opposite sides of a plane passing through the cylinder parallel to the cylinder axis and located between said axis and said intake port means, said intake and exhaust port means being uncovered by said piston during each intake-exhaust phase to exhaust spent combustion gas from the cylinder through said exhaust port means and admit fuel to the cylinder through said intake port means, said power increasing method comprising the step of:

directing additional fuel into said cylinder during each said cycle phase thru auxiliary intake ports which are situated at opposite sides of the cylinder between said plane and said exhaust port means and immediately adjacent said plane and open to the cylinder obliquely toward said plane and said primary intake port means, whereby said additional fuel enters said cylinder from opposite sides thereof and close to said plane and flows inwardly obliquely toward said plane and said primary intake means.

* * * * *